(12) United States Patent
Gleason et al.

(10) Patent No.: US 10,361,577 B2
(45) Date of Patent: Jul. 23, 2019

(54) BATTERY CHARGING AND COOLING APPARATUS

(71) Applicants: Adam Gleason, Draper, UT (US);
Manti Gleason, Draper, UT (US)

(72) Inventors: Adam Gleason, Draper, UT (US);
Manti Gleason, Draper, UT (US)

(73) Assignee: Adam Gleason, Draper, UT (US)

( * ) Notice: Subject to any disclaimer, the term of this patent is extended or adjusted under 35 U.S.C. 154(b) by 0 days.

(21) Appl. No.: 15/480,184

(22) Filed: Apr. 5, 2017

(65) Prior Publication Data

US 2017/0288419 A1    Oct. 5, 2017

Related U.S. Application Data (60) Provisional application No. 62/318,689, filed on Apr. 5, 2016.

(51) Int. Cl.
*H02J 7/00* (2006.01)
*H05K 7/20* (2006.01)

(52) U.S. Cl.
CPC ............ *H02J 7/007* (2013.01); *H02J 7/0021* (2013.01); *H02J 7/0045* (2013.01); *H05K 7/20318* (2013.01); *H05K 7/20381* (2013.01)

(58) Field of Classification Search
CPC ....... Y02E 60/12; H02J 7/0042; H02J 7/0045; H01M 10/46; H01M 10/44
USPC ......................................................... 320/107
See application file for complete search history.

(56) References Cited

U.S. PATENT DOCUMENTS

| | | | |
|---|---|---|---|
| 4,314,008 A | 2/1982 | Blake | |
| 5,343,086 A | 8/1994 | Fung et al. | |
| 5,703,470 A | 12/1997 | Baranowski et al. | |
| 5,795,664 A * | 8/1998 | Kelly | H01M 10/486 320/150 |
| 5,934,079 A | 8/1999 | Han et al. | |
| 6,040,683 A | 3/2000 | Mottier | |
| 6,057,050 A | 5/2000 | Parise | |
| 6,455,186 B1 | 9/2002 | Moores, Jr. et al. | |
| 6,633,171 B2 | 10/2003 | Brown et al. | |
| 6,653,002 B1 | 11/2003 | Parise | |
| 6,952,748 B1 | 10/2005 | Guerrero, Jr. et al. | |
| 7,061,208 B2 | 6/2006 | Nishihata et al. | |
| 7,253,586 B2 | 8/2007 | Kangas et al. | |
| 7,570,015 B2 | 8/2009 | Bansal et al. | |
| 7,663,344 B2 | 2/2010 | Le Gall et al. | |
| 8,063,607 B2 | 11/2011 | Crawford et al. | |
| 8,446,127 B2 | 5/2013 | Yazami et al. | |
| 8,595,122 B2 | 11/2013 | Kamer et al. | |
| 8,658,299 B2 | 2/2014 | Yang et al. | |
| 8,692,506 B2 | 4/2014 | Saito et al. | |
| 8,722,222 B2 | 5/2014 | Kossakovshi et al. | |

(Continued)

FOREIGN PATENT DOCUMENTS

WO    2015/028964 A1    3/2015

*Primary Examiner* — Arun C Williams
(74) *Attorney, Agent, or Firm* — Kunzler Bean & Adamson (57) ABSTRACT

An apparatus is disclosed. The apparatus may include a cooling chamber. The apparatus may include a battery slot. The battery slot may be at least partially cooled by cooling chamber. The apparatus may include a cooler. The cooler may connect to the cooling chamber. The apparatus may include a power source. The power source may be in electrical communication with the cooler. A method and system are also disclosed.

18 Claims, 5 Drawing Sheets

(56) References Cited

U.S. PATENT DOCUMENTS

| | | |
|---|---|---|
| 8,915,091 B2 | 12/2014 | Goenka |
| 8,974,942 B2 | 3/2015 | Bell et al. |
| 2005/0052160 A1* | 3/2005 | Bushong ............... H02J 7/0042 |
| | | 320/150 |
| 2006/0028182 A1* | 2/2006 | Yang ................... H01M 10/486 |
| | | 320/150 |
| 2007/0115696 A1 | 5/2007 | Berghegger |
| 2009/0096427 A1 | 4/2009 | Yang |
| 2010/0112419 A1 | 5/2010 | Jang et al. |
| 2010/0283424 A1* | 11/2010 | Tarter ...................... E04H 15/10 |
| | | 320/107 |
| 2011/0316486 A1* | 12/2011 | Inaba ....................... B60L 1/003 |
| | | 320/150 |
| 2012/0019196 A1 | 1/2012 | Fung |
| 2012/0019215 A1 | 1/2012 | Wenger et al. |
| 2012/0308854 A1 | 12/2012 | Schaefer et al. |
| 2014/0030560 A1 | 1/2014 | Lev et al. |
| 2015/0064534 A1 | 3/2015 | Lohmann et al. |
| 2015/0372513 A1 | 12/2015 | Choi et al. |
| 2017/0072813 A1* | 3/2017 | Martin ................ B60L 11/1874 |

\* cited by examiner

BATTERY CHARGING AND COOLING APPARATUS

BACKGROUND

Batteries may become hot during use. A battery may not be able to charge or may charge slowly if it is above a certain temperature. Waiting for a battery's temperature to decrease sufficiently to charge may take a long time. Furthermore, certain batteries may charge faster at certain temperatures.

SUMMARY

In one embodiment, an apparatus is disclosed. The apparatus may include a cooling chamber. The apparatus may include a battery slot. The battery slot may be at least partially cooled by cooling chamber. In one embodiment, the apparatus may include a cooler. The cooler may connect to the cooling chamber. The apparatus may include a power source. The power source may be in electrical communication with the cooler.

In some embodiments, the cooler may be configured to receive power from a battery selectively disposed proximal to the battery slot. In some embodiments, the cooling chamber may include a fan. The cooling chamber may include a condenser. The condenser may be configured to receive a coolant from the cooler and extract heat from the cooling chamber. In one embodiment, the battery slot may include a charging connector and a data connector.

In certain embodiments, the apparatus may include a power-directing circuit. The power-directing circuit may be in electrical communication with the power source and the charging connector. The power-directing circuit may be configured to read battery data from the data connector direct power from the power source to the charging connector based on the battery data. In some embodiments, the power-directing circuit being configured to read battery data from the data connector may include the power-directing circuit being configured to read battery temperature data from the data connector, and the power-directing circuit being configured to direct power from the power source to the charging connector based on the battery data may include the cooler being configured to maintain a battery of the battery slot at a predetermined temperature.

In one embodiment, the power-directing circuit may include a data input/output interface. The data input/output interface may be configured to receive power-directing data and direct power from the power source to the charging connector based on the power-directing data.

In one embodiment, the battery slot may include multiple battery slots. The power-directing circuit being configured to read battery data from the data connector may include the power-directing circuit being configured to read battery data from each of the data connectors of the plurality of battery slots. The power-directing circuit being configured to direct power from the power source to the charging connector based on the battery data may include the power source supplying power to the charging connector of at least one battery slot of the plurality of battery slots based on the battery data from the plurality of battery slots.

In one embodiment, a method is disclosed. The method may include providing a cooling chamber. The method may include providing a battery slot at least partially cooled by the cooling chamber. The method may include providing a cooler connected to the cooling chamber. The method may include providing a power source in electrical communication with the cooler. The method may include determining a temperature of a battery. The method may include cooling the battery to a predetermined temperature. The method may include, in response to the battery reaching the predetermined temperature, charging the battery.

In some embodiments, the method may include discharging charge from the battery. The method may include supplying power to a cooler with the charge. The method may include determining, from the battery, a number of times the battery has been charged since discharging charge from the battery. Discharging charge from the battery may include discharging charge from the battery based on the number of times the battery has been charged since discharging charge from the battery.

In one embodiment, charging the battery may include supplying power to the battery above a peak battery voltage. Charging the battery may include, in response to the battery charge reaching a predetermined charge threshold, reducing the power supplied to the battery.

In one embodiment, a system is disclosed. The system may include a battery-cooling apparatus. The battery-cooling apparatus may include a cooling chamber. The battery-cooling apparatus may include a battery slot. The battery slot may be at least partially cooled by the cooling chamber. In one embodiment, the battery-cooling apparatus may include a cooler. The cooler may connect to the cooling chamber. The battery-cooling apparatus may include a power source. The power source may be in electrical communication to the cooler. The system may include a battery. The battery may be configured to be selectively disposed in the battery slot.

In some embodiments, the cooler may be configured to receive power from the battery. In one embodiment, the battery-cooling apparatus may include a power-directing circuit. The power-directing circuit may be configured to direct power from the power source to the battery above a peak battery voltage. The power-directing circuit may be configured to, in response to the battery charge reaching a predetermined charge threshold, reduce the power from the power source to the battery.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Some functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
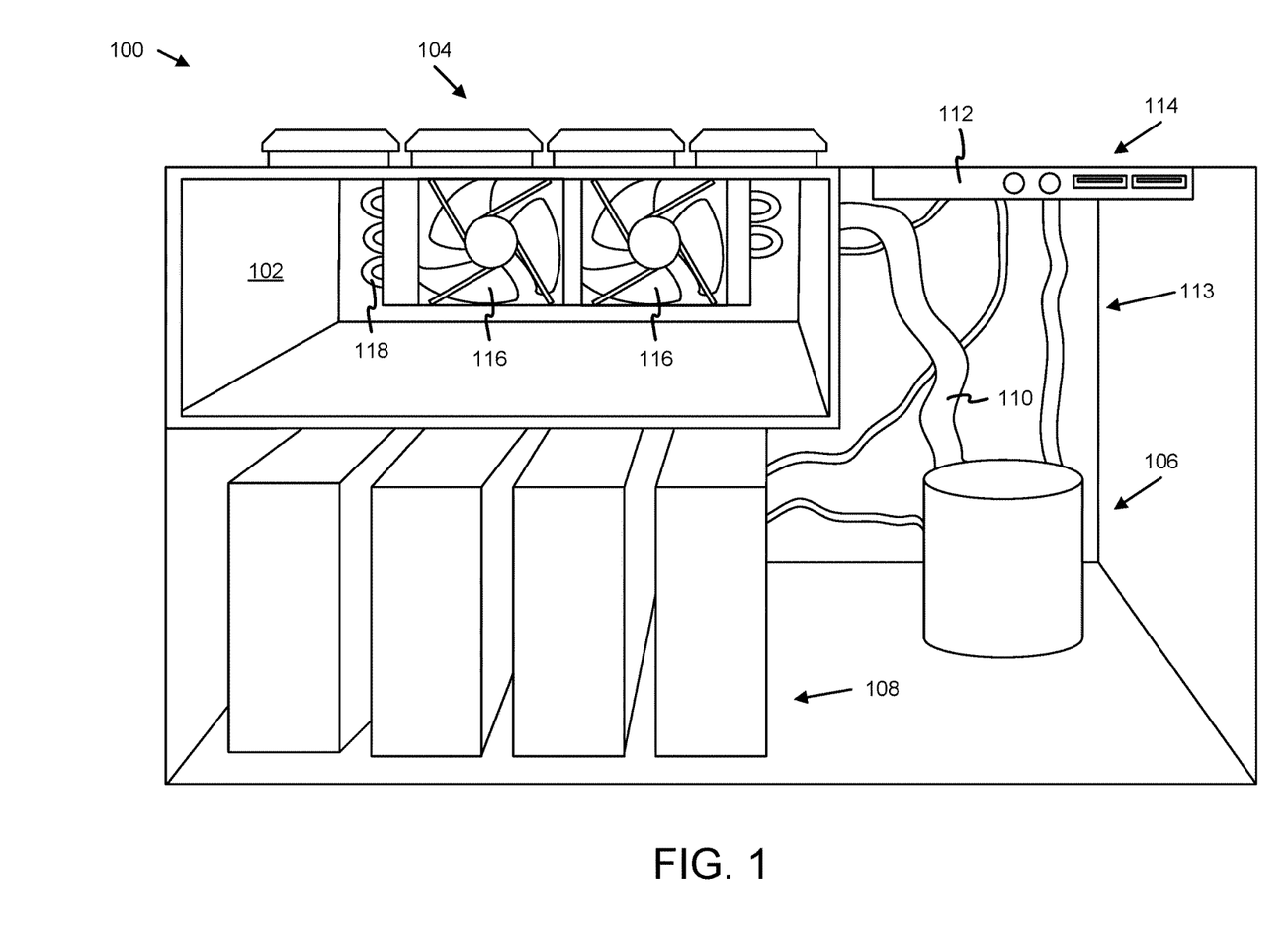
FIG. 1 is a cutaway perspective view illustrating one embodiment of a battery charging and cooling apparatus.

FIG. 1 depicts one embodiment of an apparatus 100 for battery charging and cooling. In one embodiment, the apparatus 100 may include a cooling chamber 102. In some embodiments, the apparatus 100 may include a battery slot 104. The battery slot 104 may be at least partially cooled by the cooling chamber 102. In one embodiment, the apparatus may include a cooler 106. The cooler 106 may be connected to the cooling chamber 102. In one embodiment, the apparatus 100 may include a power source 108. The power source 108 may be in electrical communication with the cooler 106.

In one embodiment, the apparatus 100 includes a cooling chamber 102. The cooling chamber 102 may be sized, shaped, or the like to surround at least a portion of one or more batteries. In one embodiment, the cooling chamber 102 may include an insulated enclosure. The cooling chamber 102 may include an insulating material that may prevent heat from entering the space inside the cooling chamber 102 or may prevent cool air from escaping the space inside cooling chamber 102. As used herein, "preventing heat from entering . . . or preventing cool air from escaping . . ." or similar phrases may include preventing a substantially amount of heat from entering/cool air from escaping. This may be because a material may not perfectly insulate. The cooling chamber 102 may include one or more openings, apertures, or the like. An opening maybe disposed proximal to a battery slot 104, described below.

In one embodiment, the cooling chamber 102 may include a fan 116. The fan 116 may circulate air in the cooling chamber 102. The fan 116 may circulate air in the cooling chamber 102 to assist the cooling chamber 102 in having a substantially uniform temperature. In one embodiment, the fan 116 may include multiple fans 116. In one embodiment, the cooling chamber 102 may include a condenser 118. The condenser 118 may be configured to receive a coolant from the cooler 106. The condenser 118 may be configured to extract heat from the cooling chamber 102. In one embodiment, heat from a battery in the cooling chamber 102 may dissipate into the cooling chamber 102 and the condenser 118 may extract that heat from the cooling chamber 102.

In one embodiment, the apparatus 100 includes a battery slot 104. The battery slot 104 may be at least partially cooled by the cooling chamber 102. In one embodiment, the battery slot 104 being at least partially cooled by the cooling chamber 102 may include the cooling chamber 102 removing heat from a battery inserted into the battery slot 104. The battery slot 104 may be disposed proximal to the cooling chamber 102. For example, as shown in FIG. 1, the battery slot 104 may be disposed on an upper side of the cooling chamber 102. The battery slot 104 being disposed on an upper side of the cooling chamber 102 may allow a portion of the battery rest in the cooling chamber in response to being inserted into the battery slot 104. In some embodiments, the battery slot 104 may be disposed on a side of the cooling chamber 102 or on another portion of the cooling chamber 102.

In one embodiment, a battery slot 104 may be sized, shaped, or the like to receive a specific type of battery. In one embodiment, the battery slot 104 may include one or more adjustable portions. The one or more adjustable portions may adjust the size, shape, or the like of the battery slot 104. Adjusting one or more portions of the battery slot 104 may include accommodating different types of batteries to be inserted into the battery slot 104.

In one embodiment, the battery slot 104 may include multiple battery slots 104. For example, as shown in FIG. 1, multiple battery slots 104 may include four battery slots 104. In some embodiments, the multiple battery slots 104 may include fewer or more than four battery slots 104. The adjustable portions of the multiple battery slots 104 may allow for simultaneous cooling and charging of different types of batteries. The battery slot 104 may be shaped, sized, or the like to prevent heat from entering the cooling chamber through the battery slot 104.

In some embodiments, a battery may include a drone battery, a power tool battery, or another battery. For example, in one embodiment, the battery slot 104 may be configured to receive a DJI-brand TB47 or TB48 battery. The battery may include a lithium-ion battery. In some embodiments, a battery may not charge at certain temperatures. A battery may include one or more temperatures above or below which the battery may not charge. For example, a certain battery may not charge above 30° C. (approx. 86° F.). In some embodiments, a battery may charge faster or slower at certain temperatures. A battery may include a temperature at which the battery may charge the fastest. For example, a battery may charge the fastest at 5° C. (41° F.).

Figure 2:
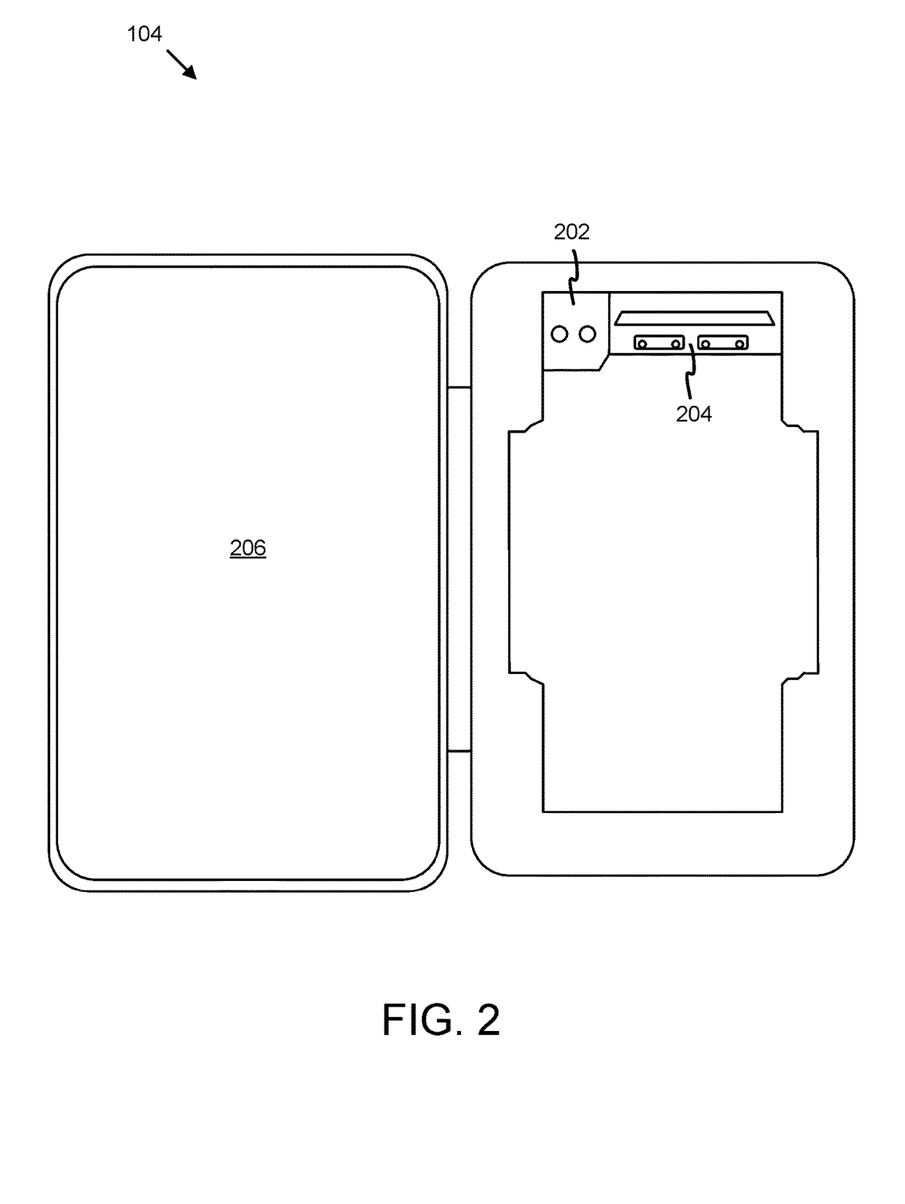
FIG. 2 is a top down view illustrating one embodiment of a battery slot.

FIG. 2 depicts one embodiment of a battery slot 104. In one embodiment, the battery slot 104 may include one or more battery connectors. A battery connector may include a connector that engages with a terminal of a battery inserted into the battery slot 104. The battery connector may selectively engage with a terminal of the battery. A battery connector may receive one or more signals, charges, or the like from the battery and propagate those signals, charges, or the like to another portion of the apparatus 100. In some embodiments, one or more portions of the apparatus 100 may send one or more signals, charges, or the like to a battery connector and the battery connector may propagate those one or more signals, charges, or the like to a battery in the battery slot 104.

In one embodiment, a battery connector may include a charging tab 202. The charging tab 202 may include a positive connector or a negative connector. The positive connector may engage with a positive terminal and the negative connector may engage with the negative terminal of the battery inserted into the battery slot 104. The positive and negative connectors may receive power from one or more portions of the apparatus 100 (for example, from the power source 108, as described below) to charge the battery in the battery slot 104. In one embodiment, the positive and negative connectors may supply power to one or more portions of the apparatus 100.

In one embodiment, a battery connector may include a data pogo 204. The data pogo 204 may include a data connector. The data pogo 204 may receive one or more signals representing one or more portions of data from the battery inserted into the battery slot 104. The data pogo 204 may propagate the received data to one or more portions of the apparatus 100. The data pogo 204 may receive data from one or more portions of the apparatus 100 and propagate that data to the battery. In one embodiment, the data may include data about the battery. For example, the data may include a charge or discharge rate of the battery, the temperature of the battery, a temperature history of the battery, a status of the battery, or the like.

In one embodiment, the battery slot 104 may include a lid 206. The lid 206 may selectively cover the battery slot 104. In one embodiment, the lid 206 may cover the battery slot 104 in response to a battery being inserted into the battery slot 104. For example, the lid 206 may cover the battery while the battery is in the battery slot 104. In one embodiment, the lid 206 may cover the battery slot 104 in response to no battery being present in the battery slot 104. The lid 206 may prevent heat from entering the cooling chamber 102. The lid 206 may include a variety of forms. For example, the lid 206 may be connect to the battery slot 104 or another portion of the apparatus 100 with a rotatable hinge. The hinge may be disposed on a top, bottom, or side of the battery slot 104. In one embodiment, the lid 206 may snap onto the battery slot 104 or another portion of the apparatus 100.

In one embodiment, the apparatus 100 may include multiple cooling chambers 102. For example, in one embodiment, each battery slot 104 of multiple battery slots 104 may include a corresponding cooling chamber 102 disposed proximal to the battery slot. The cooler 106, described below, may cool each cooling chamber 102 to a different temperature. In some embodiments, different batteries may include different temperatures at which the battery charges the fastest, most efficiently, or the like. The separate cooling chambers 102 may allow the simultaneous charging of these different batteries.

Returning to FIG. 1, in one embodiment, the apparatus 100 may include a cooler 106. The cooler 106 may receive power from the power source 108, as described below. The cooler may connect to the cooling chamber 102 through the coolant channel 110. In one embodiment, in response to receiving power, the cooler 106 may transfer heat away from the battery slot 104 and cool the battery inside the battery slot 104. The cooler 106 may transfer heat away from or extract heat from the battery by supplying the condenser 118 with a coolant that extracts heat from the cooling chamber 102 as described above. The cooler 106 may supply coolant to the condenser 118 through the coolant channel 110.

In one embodiment, the cooler 106 may be disposed at least partially inside the cooling chamber 102. The cooler 106 may include the condenser 118, the fan 116, or the like. In one embodiment, the cooler 106 may couple to the battery slot 104, be disposed on the battery slot 104, be disposed proximal to the battery slot 104, or the like. In one embodiment, the cooler 106 may couple to the cooling chamber 102. The cooler 106 may transfer heat away from the battery slot 104, the battery inserted into the battery slot, or the like. In one embodiment, the cooler 106 may transfer heat outside the cooling chamber. For example, in one embodiment, the cooler 106 may be disposed proximal to an aperture in the apparatus 100. The aperture may be disposed proximal to a fan and the cooler 106 may transfer heat toward the fan. The fan may be disposed proximal to the cooling chamber 102 or another portion of the apparatus 100.

In one embodiment, one or more components of the apparatus 100 or a component associated with the apparatus 100 may include one or more temperature thresholds. For example, a battery, battery slot 104, the cooling chamber 102, or the like may each include one or more temperature thresholds. In response to the temperature of the component reaching a certain temperature threshold, the cooler 106 may reduce the rate at which the cooler 106 cools the cooling chamber 102. Reducing the rate of cooling may include ceasing to cool the cooling chamber 102, a battery slot 104, or a battery inserted into the battery slot 104. In one embodiment, reducing a rate of cooling or ceasing cooling may reduce the amount of power the cooler 106 consumes. The cooler 106 ceasing to cool may include the cooler 106 deactivating. In certain embodiments, the temperature threshold of the component may include a predetermined threshold. In one embodiment, the temperature threshold may be calculated, received from an external source (e.g. the battery, user input, or the like).

In one embodiment, the cooler 106 may include a thermoelectric cooling element. The thermoelectric cooling element may include a thermoelectric heat pump. The thermoelectric heat pump may transfer heat from one side of the pump to the other. The thermoelectric cooling element may include a hot side and a cold side. An electric current may flow through the thermoelectric cooling element. In response to the electric current, the cold side may transfer heat to the hot side. In response to the cold side transferring heat, the cold side may become cooler. In one embodiment, the hot side may couple to a heat sink.

In one embodiment, the thermoelectric cooling element may be disposed inside the cooling chamber 102. In one embodiment, the hot side may be disposed toward a fan, for example, the fan 116 or another fan. In one embodiment, the hot side may be disposed on the outside of the cooling chamber 102. The cold side may be disposed on the inside of the cooling chamber 102. In one embodiment, in response to the thermoelectric cooling element transferring heat from the cold side to the hot side, the temperature of the interior of the cooling chamber 102 may decrease. In response to the temperature of the interior of the cooling chamber 102 decreasing, the temperatures of a battery in the battery slot 104 may decrease.

In some embodiments, the thermoelectric cooling element may provide heat to the battery inside the battery slot 104. Heating the battery may raise the temperature of the battery. The thermoelectric cooling element may transfer heat from the cold side to the hot side. The hot side may be disposed towards the battery slot, batteries, or the inside of the cooling chamber. In some embodiments, the thermoelectric cooling element may include multiple thermoelectric cooling elements, for example, one thermoelectric cooling element for cooling the battery and one thermoelectric cooling element for heating the battery.

In one embodiment, the cooler 106 may include a refrigerant cooling element. The refrigerant cooling element may include the condenser 118. In one embodiment, the condenser 118 may include an evaporator coil. The evaporator coil may be disposed inside the cooling chamber 102. In some embodiments, a compressor may drive the evaporator coil, the condenser 118 or a fan. The compressor may receive power from a power source, such as the power source 108. The compressor may be disposed inside the cooling chamber 102 or proximal to the cooling chamber 108. In some embodiments, the compressor may be disposed in another location in relation to the apparatus 100. In one embodiment, the refrigerant may include FREON or the like.

In one embodiment, the apparatus 100 may include a power source 108. A power source 108 may supply power to the apparatus 100 or one or more portions, components, or the like of the apparatus 100. The power source 108 may supply power to the charging tab 202 of the battery slot. The charging tab 202 may propagate the power to the battery inserted into the battery slot 104 and charge the battery. In one embodiment, the power includes electricity. The power source 108 may include a power adapter (for example, an AC/DC or DC/DC adapter or the like), a power supply, a connector (for example, a DC connector, mains power connector, or the like), or one or more other electronic devices that supply electrical energy to the apparatus 100 or one or more portions of the apparatus 100. In one embodiment, a power supply may include multiple power supplies.

In one embodiment, the power source 108 may receive power from an external power source. For example, the power source 108 may receive power from a wall socket, a generator, a battery, or the like. The external power source may supply electricity to the power source 108 at different voltages. For example, a certain external power source may supply electricity to the power source 108 at 100 volts (V), 240V, or another voltage. In one embodiment, the power source 108 or another portion of the apparatus 100 may include a selector switch. The selector switch may toggle the voltage at which the power source receives power. A user may adjust the selector switch to toggle the voltage at which the power source 108 receives power. In one embodiment, the power source 108 or another portion of the apparatus 100 may automatically detect the voltage of input power and, in response to detecting the voltage, toggle the voltage at which the power source 108 receives power.

In one embodiment, the power source 108 may receive power from the battery inserted into the battery slot 104. In some embodiments, a battery may hold a charge longer, discharge at a more efficient rate, or may otherwise perform more efficiently or better in response to completely discharging. In one embodiment, the term "deep cycling" may include the battery discharging from its remaining charge and supplying the discharge to the power source 108. In some embodiments, a battery may perform more better in response to being deep cycled at a regular interval (e.g. every ten charges, every five charges, or the like). In response to deep cycling the battery, the battery may heat up. By using the discharge of the battery to power the power source 108, and thus, the cooler 106, in response to deep cycling, the cooler 106 may cool the battery and keep its temperature lower in preparation or in response to charging the battery.

In one embodiment, a user may configure the apparatus 100 to deep cycle a battery after a number of times charged as configured by the user. In one embodiment, the battery may store the number of charges it has received. In one embodiment, the apparatus 100 may store the number of times it has charged a certain battery. In one embodiment, the apparatus 100 may receive charge data, such as the number of charges, number of charges since the last deep cycle, or the like, of the battery from the data pogo 204. The apparatus 100 may receive battery data, such as a piece of data unique to a battery that identifies the battery, from the data pogo 204.

In one embodiment, the apparatus 100 includes a charging port 114. The charging port 114 may supply power from the power source 108 to an external device. In one embodiment, the charging port 114 may include a Universal Serial Bus (USB) port. The USB port may include Type-A, Type-B, Type-C, or another type. In certain embodiments, the charging port 114 may include an auxiliary port for a specific type of device. The charging port 114 may receive a connector from an external device and supply power through the connector. For example, in one embodiment, the charging port 114 may include an auxiliary port for a drone controller. In one embodiment, the charging port 114 may include multiple charging ports 114. The multiple charging ports may include one or more charging ports 114 of different types.

In one embodiment, the power source may supply power to the charging port 114. The power source 108 may supply power to the charging port 114 at differing voltages. For example, in one embodiment, the power source 108 may supply power to a USB port at 5V, less than 5V, or greater than 5V. The power source 108 may supply power to a USB port at 3.1 amps, less than 3.1 amps (for example, 2.1 amps), or greater than 3.1 amps. In one embodiment, the power source 108 may supply power to an auxiliary port at 26.3V, less than 26.3V, or greater than 26.3V. The power source 108 may supply power to an auxiliary port at 180 watts, less than 180 watts (for example, 100 watts), or greater than 180 watts.

In one embodiment, the charging port 114 may supply power to the power source 108. The device connected to the apparatus via the charging port 114 may deep cycle. The deep cycling may include a deep cycling similar to the deep cycling of the battery, as described above.

In one embodiment, the apparatus 100 includes a power-directing circuit 112. The power-directing circuit 112 may be in electrical communication with the power source 108, the cooler 106, the battery slot 104, or the charging port 114. In some embodiments, the power-directing circuit 112 may be in electrical communication through one or more cables 113. The one or more cables may include one or more cables, wires, or the like. In one embodiment, the power-directing circuit 112 may include hardware, software, and/or a combination of hardware, software, and/or other components as described above. The power-directing circuit 112 may distribute a total available power from the power source 108 to the battery slot 104, cooler 106, and charging port 114. In some embodiments, distributing power may include the power-directing circuit 112 directing the power source 108 to supply power to one or more battery slots 104 or charging ports 114 at different rates, levels, or the like. In some embodiments, directing power may include hardware of the power-directing circuit 112 distributing power, software of the power-directing circuit 112 executing instructions, or the like in response to receiving input from a user.

In one embodiment, distributing power may include the power-directing circuit 112 directing the power source 108 to supply power to one or more components of the apparatus 100, such as one or more components of the power-directing circuit 112, the battery slot 104, cooler 106, charging ports 114, or the like. Distributing power may include the power-directing circuit 112 directing the power source 108 to power to one or more specified battery slots 104 or charging ports 108. In some embodiments, distributing power may include the power-directing circuit 112 directing the power source 108 to supply power to an unpowered portion of the apparatus 100 or to supply additional power to an already-powered portion of the apparatus 100. The power-directing circuit 112 may distribute power based, at least in part, on input received from a user. In one embodiment, the power-directing circuit 112 may distribute power, at least in part, based on default parameters, settings, configurations, or the like. The power-directing circuit 112 may distribute power, at least in part, based on data, signals, or the like received from a battery inserted in the battery slot 104.

In one embodiment, the total available power from the power source 108 may include a range. For example, in one embodiment, the total available power may include the range of 100 watts to 1200 watts. The range may include a different range. In one embodiment, the power-directing circuit 112 may adjust the total available power. The power-directing circuit 112 may adjust the total available power in response to user input.

In some embodiments, the power-directing circuit 112 may be configured to read battery data from the data pogo 204. The power-directing circuit 112 may be configured to direct power from the power source 108 to the charging tab 202 based on the battery data. For example, the power-directing circuit 112 may read temperature data from the battery. Based on that temperature data, the power-directing circuit 112 may adjust a charge supplied to the battery from the power source 108. In one embodiment, the power-directing circuit 112 directing power from the power source 108 to the charging tab 202 may include the cooler 106 adjusting its operation to maintain the battery at a predetermined temperature, lower the temperature of the battery, or raise the temperature of the battery.

In one embodiment, the battery slot 104 may include multiple battery slots 104. The power-directing circuit 112 may be configured to read data from battery data from each battery inserted into the battery slots 104. The power source 108 may supply power to the charging tab 202 of at least one battery slot 104 based on the battery data from the multiple battery slots 104. In one embodiment, the power-directing circuit may be configured to read data from the charging port 114. For example, the power-directing circuit 112 may receive data from a USB port. The data may include a charge level of a device connected via the USB port, other device data, or the like.

In one embodiment, the power-directing circuit 112 may distribute used power and unused power to one or more portions of the apparatus 100. Used power may include power consumed by one or more portions of the apparatus 100. Unused available power may include the total available power minus the used power. For example, in one embodiment, the total available power may include 1200 watts and one or more portions of the apparatus may use 700 watts (the used power). In this example, the unused available power is 500 watts (1200 watts minus 700 watts). In one embodiment, the used power may increase and the unused power may decrease in response to the power-directing circuit 112 distributing power to one or more portions of the apparatus 100. The used power may decrease and the unused power may increase in response to the power-directing circuit 112 distributing less power or ceasing to distribute power to one or more portions of the apparatus 100.

For example, in one embodiment, the total available power may include 1200 watts. The apparatus 100 may charge one device via a USB slot, two devices via two auxiliary slots, and one battery in a battery slot 104. Charging the device plugged into the USB slot may consume 15.5 watts. Charging the two devices plugged into the two auxiliary slots may each consume 180 watts. The cooler may consume 500 watts. Charging the battery may consume the remaining power (324.5 watts).

In one embodiment, the total available power may include 1200 watts. In one embodiment, the apparatus 100 may charge four batteries in four battery slots 104. In one embodiment, the cooler 106 may consume 600 watts and charging the batteries may consume remaining power (150 watts each).

In one embodiment, the total available power may include 500 watts. The apparatus 100 may charge one device via a USB slot, one device via an auxiliary slot, and one battery in the battery slot 104. Charging the USB device may consume 15.5 watts and charging the auxiliary device may consume 180 watts. The cooler 106 may consume 200 watts. Charging the battery may consume the remaining power (104.5 watts).

In one embodiment, the total available power may include 100 watts. The apparatus 100 may charge one battery. Charging the battery may consume the available power (100 watts). The cooler 106 may not receive power and, thus, not cool the cooling chamber 102.

In one embodiment, the total available power may include 1200 watts. The apparatus 100 may charge one battery. The cooler 106 may consume 400 watts. Charging the battery may consume 600 watts. The remaining power (200 watts) may be unused.

In one embodiment, the power-directing circuit 112 may include a data input/output interface. The data input/output interface may be configured to receive power-directing data. The data input/output interface may be configured to direct power from the power source 108 to the charging tab 202 based on the power-directing data. The data input/output interface may include a variety of forms. For example, in one embodiment, the data input/output interface may include a network card, a wireless communication device, an I/O device (such as a keyboard, mouse, touchscreen, or the like), or the like. The data input/output interface may be in data communication with an external device. Being in data communication may include wired communication, for example, through a USB cable or the like. Being in data communication may include wireless communication, for example, WI-FI, BLUETOOTH, radio frequency, or the like.

In one embodiment, the power-directing circuit 112 may include firmware. The firmware may include software or the like configured to control power distribution functions, communication functions, and like of the power-directing circuit 112. The power-directing circuit 112 may change the firmware. For example, the power-directing circuit 112 may receive firmware updates from the data input/output interface. The firmware may include instructions related to directing power from the power source 108 to the charging tab 202, charging port 114, or other instructions related to the operation of the apparatus 100.

In one embodiment, the power-directing circuit 112 may determine the remaining charge in a battery in response to a user inserting the battery into the battery slot 104. The power-directing circuit 112 may determine the remaining charge in a device in response to a user inserting a device or device cable into a charging port 114. The power-directing circuit 112 may determine the battery's remaining charge from the charging tab 202 or the data pogo 204. The power-directing circuit 112 may determine the device's remaining charge. In response to determining the battery or device's remaining charge, the power-directing circuit 112 may distribute power to the battery or device.

Figure 3:
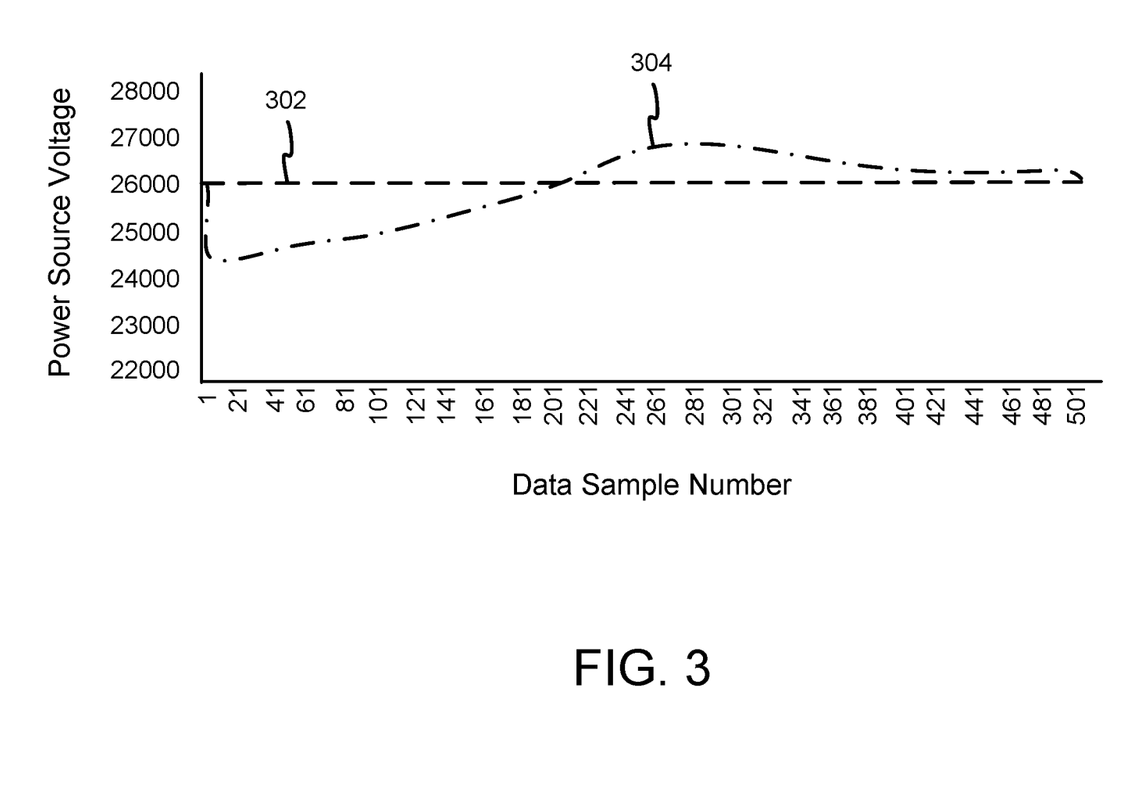
FIG. 3 is a graph illustrating one embodiment of a charging voltage over time.

FIG. 3 depicts one embodiment of a charge to a battery over time. In certain embodiments, the power-directing circuit 112 may include one or more charge thresholds. A charge threshold may include a peak voltage 302. In one embodiment, the power-directing circuit 112 may direct power to a battery in the battery slot 104 above a peak voltage 302. For example, the peak voltage 302 may include the voltage at which other battery chargers charge the battery. In some embodiments, the battery may heat up to an unsafe temperature or overheat in response to charging the battery above the peak voltage 302. For example, in one embodiment, as depicted in FIG. 3, the peak voltage 302 may include 26,000 mV. The peak voltage 302 may remain constant during charging in other chargers.

In one embodiment, the power-directing circuit 112 may direct power to the battery at a voltage 304 under the peak voltage 302 for a period of time. For example, as depicted in FIG. 3, the power source 108 may supply power to the battery under the peak voltage 302 from data sample 1 to data sample 221. In some embodiments, the power-directing circuit may direct power to the battery at a voltage 304 above the peak voltage 302. For example, the power source 108 may supply power to the battery above the peak voltage 302 from data sample 221 to data sample 501. The voltage 304 may peak at a voltage above the peak voltage 302. For example, as depicted in FIG. 3, the voltage 304 may peak around 27,000 mV at about data sample 270. In one embodiment, in response to the battery being almost fully charged, the voltage 304 may reach the peak voltage 302 as shown in FIG. 3.

In response to the battery receiving power above a peak voltage 302, the battery may maintain a rate of charge. In some embodiments, in response to the battery reaching a first predetermined charge and receiving power above a peak voltage 302, the temperature of the battery may reach a certain temperature. However, in response to the cooler 106 extracting heat from the cooling chamber 102, the temperature of the battery may be maintained at a lower temperature. In one embodiment, in response to the battery reaching a second predetermined charge, the power-directing circuit 112 may reduce the power supplied to the battery by the power source 108.

The voltages, such as the peak voltage 302 and the voltage 304, the data sample numbers, and the voltages over time illustrated in FIG. 3 are for illustration purposes. The voltages, data sample numbers, and voltages over time may vary while still charging a battery faster than other chargers.

The power-directing circuit 112 may adjust the power flow to a battery or device in response to the charge of the battery or device reaching a threshold charge. For example, in one embodiment, in response to the battery or device's charge reaching 90%, the power-directing circuit 112 may reduce the rate of charge to the battery or device. In one embodiment, in response to the battery or device reaching a threshold charge, the power-directing circuit 112 may stop charging the battery or device. For example, in response to the battery or device reaching a charge of 100%, the power-directing circuit 112 may stop charging the battery or device. In one embodiment, in response to the power-directing circuit 112 reducing a rate of charge or stopping charge to a battery or device, the unused available power may increase.

In one embodiment, the power-directing circuit 112 may include one or more default charge thresholds. For example, in one embodiment, the default charge threshold to reduce a rate of charge for a battery or device may be 90% and the default charge threshold to stop charging a battery or device may be 100%. In one embodiment, a user may adjust one or more charge thresholds. For example, a user may set the charge threshold to reduce a rate of charge for a battery or device at 80% and the charge threshold to stop charging a battery or device at 95%. The above charge thresholds are examples and should not be read as limiting. A charge threshold may include a charge from 0% to 100%.

In one embodiment, the power-directing circuit 112 may determine the temperature of a battery in response to a user inserting the battery into the battery slot 104. The power-directing circuit 112 may determine the battery's temperature from the data pogo 204. In response to the battery's temperature being above a threshold temperature, the power-directing circuit 112 may distribute power to the cooler 106. In some embodiments, in response to battery's temperature decreasing, the power-directing circuit 112 may distribute additional power to the battery slot 104 and charge the battery at a faster rate. In one embodiment, in response to the battery's temperature decreasing and reaching a lower temperature than a temperature threshold, the power-directing circuit 112 may distribute less power to the cooler 106.

In some embodiments, supplying additional power to the cooler 106 may decrease the temperature of the cooling chamber 102 or may decrease the temperature of the cooling chamber 102 at a faster rate. In one embodiment, supplying additional power to the cooler 106 may maintain a temperature of the cooling chamber 102 at a constant temperature. For example, inserting a hot battery into the battery slot 104 may increase the temperature of the interior of the cooling chamber and supplying more power to the cooler 106 may prevent the temperature of the interior of the cooling chamber 102 from rising.

As described above, in certain embodiments, in response to a battery or device reaching a threshold charge, the power-directing circuit 112 may reduce the rate of charge or may stop charging that battery or device. In some embodiments, in response to reaching a threshold temperature, the cooler 106 may reduce the rate of cooling or may deactivate. In response to reducing the rate of charge, ceasing charging a battery or device, reducing the rate of cooling or deactivating the cooler 106, the unused power available to the apparatus 100 may increase. The power-directing circuit 112 may automatically distribute power to one or more portions of the apparatus 100. For example, in response to the used power increasing, the power-directing circuit 112 may automatically begin charging a device or battery, increase the rate of charging a device or battery, activate the cooler 106, or increase the rate of cooling in response to one of the unused power increasing.

In one embodiment, in response to the unused power increasing, the power-directing circuit 112 may automatically distribute power to one or more portions of the apparatus 100 according to one or more user-configured parameters. In one embodiment, a user may configure the power-directing circuit 112 to distribute power to one or more portions of the apparatus 100 in a certain order. For example, in one embodiment, the user may configure the power-directing circuit 112 to: first, distribute power to the one or more devices connected via the USB port(s); second, distribute the remaining power (if any) to the one or more devices connected via the auxiliary port(s); third, distribute the remaining power (if any) to one or more batteries inserted into one or more battery slots 104; and lastly, distribute the remaining power (if any) to the cooler 106. The preceding example is given as example only. A user-configured parameter may include a different order and may include fewer or more portions or components of the apparatus 100.

In some embodiments, in response to the unused power increasing, the power-directing circuit 112 may automatically distribute power according to one or more default parameters. The default parameters may include one or more parameters included with the power-directing circuit 112. The default parameters may include one or more parameters included with the power-directing circuit 112 prior to a user providing user input.

In certain embodiments, in response to a user connecting a device via a charging port 114 or inserting a battery into the battery slot 104, the power-directing circuit 112 may automatically distribute power according to one or more user-configured parameters. In one embodiment, a user may configure the power-directing circuit 112 to distribute power to one or more portions of the apparatus 100 in a certain order. For example, as described above, the user may configure the power-directing circuit 112 to: first, distribute power to the cooler 106; second, distribute the remaining power (if any) to one or more batteries inserted into one or more battery slots 104; and finally, distribute the remaining power (if any) to the one or more devices connected to one or more charging ports 114.

In one embodiment, the power-directing circuit 112 may adjust the distribution of power in response to a user connecting a device to the apparatus 100 for charging or in response to a user inserting a battery into the battery slot 104 for charging. For example, in response to a user plugging in a device to a USB port, the power-directing circuit 112 may distribute power to the device. The power-directing circuit 112 may distribute unused power or may decrease power supplied to one or more batteries or devices or may decrease power supplied to the cooler 106 as described above.

For example, in one embodiment, the total available power may include 1200 watts. The power-directing circuit 112 may include a battery charging threshold of 90%. In response to one battery reaching 90% charge, the power-directing circuit 112 may distribute 100 watts of power to that battery. The power-directing circuit 112 may include a user-configured parameter specifying the order for charging devices or batteries and powering the cooler 106. The order may include: (1) USB ports, (2) auxiliary ports, (3) batteries, and (4) cooler 106. The power-directing circuit 112 may include a user-configured parameter specifying that the maximum power supplied to a battery may be 200 watts. For example, the apparatus 100 may charge two batteries in the battery slots 104 and the cooler 106 may be active. Charging a battery may consume 200 watts (600 total) and the cooler 106 may consume 600 watts.

Continuing the example, a battery may reach 90% charge. In response to the battery reaching 90%, the power-directing circuit 112 may distribute 100 watts to that battery. In response to distributing 100 watts to the battery, the unused power may increase from 0 watts to 100 watts. In response to the unused power increasing, the power-directing circuit 112 may distribute the unused power to the cooler 106 (because there are not USB or auxiliary devices and all the batteries are consuming their maximum power).

Continuing the example, a user may connect a USB device to a USB port of the apparatus 100. Charging the USB device may include the USB device consuming 15.5 watts. In response to the user connecting a USB device, the power-directing circuit 112 may distribute power from the cooler 106 to the USB device.

In one embodiment, in response to a user inserting a battery into a battery slot 104, a portion of the apparatus 100 may determine the temperature of the battery. In response to the temperature of the battery being above a temperature threshold, the power-directing circuit 112 may distribute power to the cooler 106. The power-directing circuit 112 may distribute unused power or may decrease power supplied to one or more batteries or devices as described above.

In one embodiment, a user-configured parameter may include a power amount specified by the user for a specified portion of the apparatus 100 (for example, the battery slot 104) or type of portion of the apparatus 100 (for example, all of the one or more battery slots 104). For example, the user may configure the power-directing circuit 112 to distribute 100 additional watts to the cooler 106 in response to unused power increasing. The power-directing circuit 112 may distribute 100 watts to the cooler 106 and may distribute remaining unused power (if any) to the next portion(s) of the apparatus 100 according to the one or more user-configured parameters.

Figure 4:
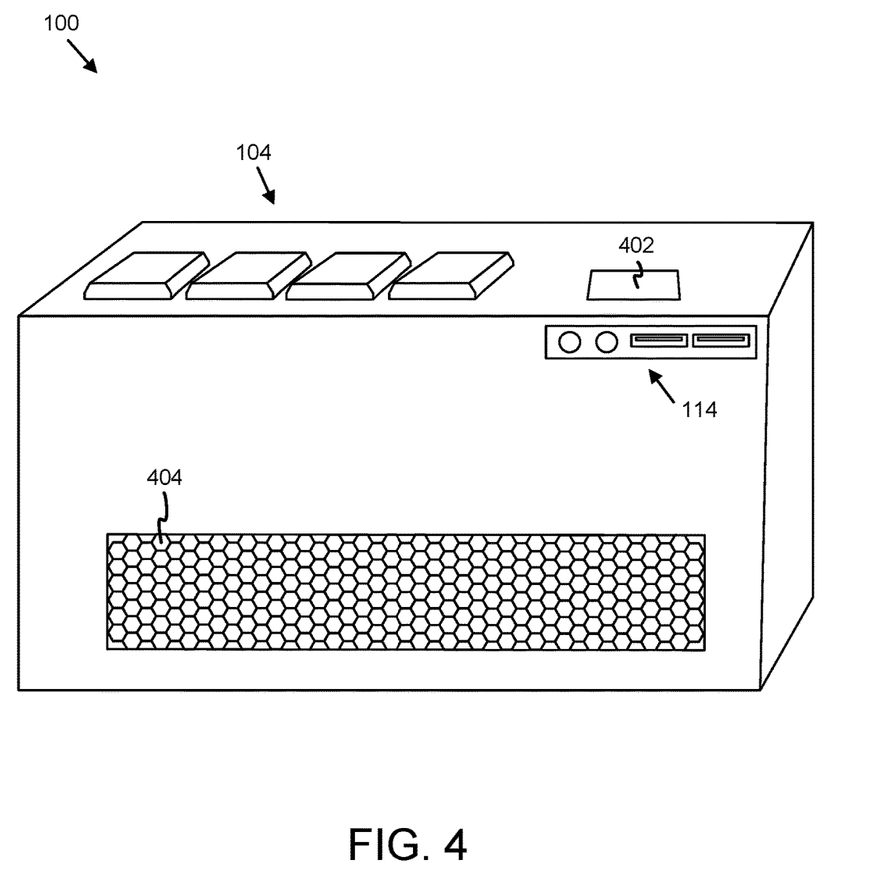
FIG. 4 is a perspective view illustrating another embodiment of a battery charging and cooling apparatus.

FIG. 4 depicts one embodiment of the apparatus 100. In one embodiment, the apparatus 100 may include a user interface 402. The user interface 402 may include a user interface disposed on the apparatus 100. In one embodiment, the user interface 402 may include a user interface external to the apparatus 100. The external user interface may be in data communication with the apparatus 100. For example, in one embodiment, the user interface 402 may include a computing device, such as a laptop, desktop computer, tablet, smart phone, or the like. The user interface 402 may be in data communication with the apparatus 100. For example, the user interface 402 may be in data communication with the apparatus 100 through the data input/output interface of the power-directing circuit 112.

In one embodiment, the user interface 402 may include a screen. The screen may display information about the apparatus 100 to the user. The screen may display a status of the power distribution to one or more portions of the apparatus 100. For example, the screen may display an amount of power consumed by each portion of the apparatus 100, a percentage of power consumed by each portion of the apparatus 100, or the like. The screen may display the temperature of the cooling chamber, one or more batteries, the cooler 106, or the like. The screen may display an amount of unused power (if any). The screen may display a power distribution order, program, routine, or the like as described below. The user may input instructions, commands, parameters, configurations, or the like via the user interface 402. The user interface 402 may include one or more buttons, scroll wheels, lights, screens, or the like that a user may use to interact with the apparatus 100 and/or input instructions, parameters, or the like into the apparatus 100. In one embodiment, the screen may include a touchscreen. The user may interact with the touchscreen to input user input.

In one embodiment, a user may configure the power distribution of the power-directing circuit 112. The user may configure the power distribution in a variety of ways. In one embodiment, the user may input an amount of power for the power-directing circuit 112 to distribute to one or more portions of the apparatus 100. For example, the user may input a configuration that includes the power-directing circuit 112 distributing 300 watts to one battery slot 104, 300 watts to another battery slot 104, and 600 watts to the cooler 106. In one embodiment, the user may input one or more percentages of the total available power that one or more portions of the apparatus 100 receive from the power source 108. For example, the user input a configuration that includes the power-directing circuit 112 distributing 5% of the total available power to a USB port, 20% to a battery slot 104, and 45% to the cooler 106.

In some embodiments, a user may input an invalid power distribution configuration. An invalid power distribution configuration may include a configuration that distributes more power than the total available power, a percentage configuration with a total above 100%, or the like. In response to the user inputting an invalid power distribution configuration, the power-directing circuit 112 may not allow the user to input one or more parts of the configuration. The power-directing circuit 112 may display an error to the user in response to an invalid power distribution configuration.

In one embodiment, the apparatus 100 may include an air escape 404. The air escape 404 may include an aperture. The aperture may allow heated air or the like to escape from the interior of the apparatus 100. The air escape 404 may include a grate or the like over the aperture. The grate may prevent debris or the like from entering the interior of the apparatus 100. The grate may provide structural support to the aperture. The air escape 404 may include a variety of sizes and shapes. For example, the air escape 404 may include a circular, rectangular, or the like shape.

In one embodiment, the air escape 404 may be disposed proximal to the power source 108. In one embodiment, the air escape 404 may be disposed proximal to the cooler 106. In one embodiment, the air escape 404 may be disposed proximal to the power-directing circuit 112. In some embodiments, the apparatus 100 may include multiple air escapes 404.

As shown in FIG. 3, the charging port 114 may be disposed on an exterior of the apparatus 100. The charging port 114 may be disposed proximal to the user interface 402, the power-directing circuit 112, or the like. In one embodiment, the charging port 114 may include multiple charging ports 114 or may include multiple types of charging ports 114. The same types of charging ports 114 may be disposed proximal to each other. The groups of charging ports 114 may be disposed in different locations on the apparatus 100.

Figure 5:
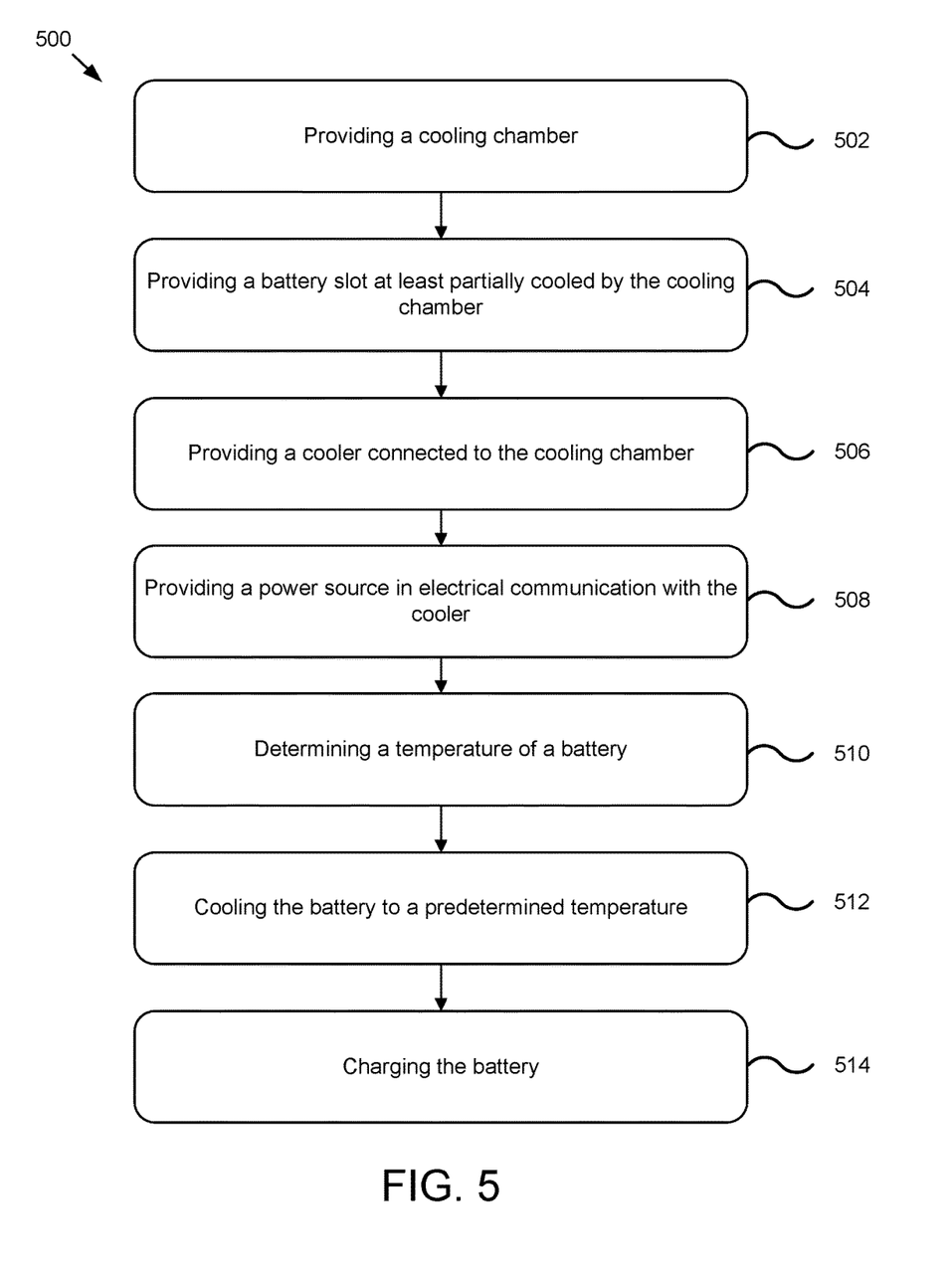
FIG. 5 is a flowchart diagram illustrating one embodiment of a battery charging and cooling method.

FIG. 5 depicts one embodiment of a method 500. The method 500 may include providing 502 a cooling chamber. The method 500 may include providing 504 a battery slot at least partially cooled by the cooling chamber. The method 500 may include providing 506 a cooler connected to the cooling chamber. The method 500 may include providing 508 a power source in electrical communication with the cooler. The method 500 may include determining 510 a temperature of a battery. The method 500 may include cooling 512 the battery to a predetermined temperature. The method 500 may include in response to the battery reaching the predetermined temperature, charging 514 the battery.

In one embodiment, providing 502 the cooling chamber may include the cooling chamber 102, as described herein. Providing 504 a battery slot may include the battery slot 104, as described herein. Providing 506 the cooler may include the cooler 106, as described herein. Providing the power source may include the power source 108, as described herein.

In one embodiment, determining 510 the temperature of the battery may include the data pogo 204 of the battery slot 104 receiving temperature data from the battery inserted into the battery slot 104, as described above. The data pogo 204 may propagate the temperature data to the power-directing circuit 112. In one embodiment, cooling 512 the battery to a predetermined temperature may include the power-directing circuit directing power from the power source 108 to the cooler 106. The cooler 106 may cool the cooling chamber 102 or the battery inserted into the battery slot 104 to a predetermined temperature, as described above. In one embodiment, charging 514 the battery may include the power-directing circuit 112 directing power from the power source 108 to the charging tab 202 of the battery slot. The charging tab 202 may propagate the charge to the battery, as described above.

In one embodiment, the method 500 may include discharging charge from the battery. The method 500 may include supplying power to the cooler with the charge. In one embodiment, discharging charge from the battery and supplying power to the cooler with that charge may include the deep cycling described above. In one embodiment, the method 500 may include determining, from the battery, a number of times the battery has been charged since discharging charge from the battery. Discharging charge from the battery may include discharging charge from the battery based on the number of times the battery has been charged since discharging charge from the battery. As described above, the battery, the apparatus 100, or the like may store the number of times a battery has been charged or the number of times a battery has charged since it was last deep cycled.

In one embodiment, charging 514 the battery may include supplying power to the battery above a peak battery voltage. Charging 514 the battery may include, in response to the battery charge reaching a predetermined charge threshold, reducing the power supplied to the battery. For example, as described above, the power source 108 may supply power to the battery above a peak voltage of the battery. In response to reaching a predetermined charge threshold, the power source 108 may reduce the power supplied to the battery. This may allow the battery to charge faster. The cooler 106 may cool the battery to prevent the battery from overheating, as described above.

In one embodiment, the method 500 may include maintaining the battery at a second predetermined temperature in response to charging the battery. For example, as described above, in some embodiments, a battery may be chargeable below a first temperature threshold, but may charge faster, more efficiently, or the like at a second temperature threshold. Maintaining the battery at a second temperature threshold may include the cooler 106 cooling the cooling chamber 102 to that second temperature threshold.

In one embodiment, determining 510 the temperature of the battery may include determining the temperature of each battery of multiple batteries. As described above, the battery slot 104 may include multiple battery slots 104. Each battery in the battery slots 104 may be at a different temperature and the data pogo 204 of each battery slot 104 may determine the temperature of the battery and propagate that temperature data to the power-directing circuit 112. In one embodiment, charging the battery may include supplying charge to each of the multiple batteries based on the temperature of each battery. For example, in one embodiment, a first battery may be below a threshold temperature and ready to receive a charge. A second battery may be above the threshold temperature. In response, the power-directing circuit 112 may direct power from the power source 108 to the first battery (through the battery slot 104) but not to the second battery. The power-directing circuit 112 may direct power to the second battery in response to the battery reaching the temperature threshold (for example, in response to the cooler 106 cooling the cooling chamber 102 and extracting heat from the battery).

In some embodiments, the method 500 may include other steps, operations, actions, or the like described above in relation to the apparatus 100 or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a cooling chamber;
   a plurality of battery slots at least partially cooled by the cooling chamber, the battery slots configured to receive batteries for charging and cooling the batteries, wherein the batteries are removable from the battery slots to power a device other than the apparatus;
   a cooler connected to the cooling chamber;
   a power source in electrical communication with the cooler; and
   a power-directing circuit in electrical communication with the power source and the plurality of battery slots, wherein the power-directing circuit is configured to read battery data from the plurality of battery slots, and direct power from the power source to at least one of the battery slots based on the battery data.

2. The apparatus of claim 1, wherein the cooler is configured to receive power from at least one of the batteries.

3. The apparatus of claim 1, wherein the cooling chamber comprises:
   a fan; and
   a condenser, wherein the condenser is configured to:
   receive a coolant from the cooler, and
   extract heat from the cooling chamber.

4. The apparatus of claim 1, wherein the battery slots comprise:
   charging connectors; and
   data connectors.

5. The apparatus of claim 4, wherein the power-directing circuit is configured to:
   read the battery data from the data connectors; and
   direct power from the power source to at least one of the charging connectors based on the battery data.

6. The apparatus of claim 5, wherein:
   the power-directing circuit being configured to read battery data from the data connectors comprises the power-directing circuit being configured to read battery temperature data from the data connectors; and
   the power-directing circuit being configured to direct power from the power source to the at least one charging connector based on the battery data comprises the cooler being configured to maintain a battery at a predetermined temperature.

7. The apparatus of claim 5, wherein the power-directing circuit comprises a data input/output interface configured to:
   receive power-directing data; and
   direct power from the power source to the at least one charging connector based on the power-directing data.

8. The apparatus of claim 5, wherein:
   the power-directing circuit being configured to read battery data from the data connectors comprises the power-directing circuit being configured to read battery data from each of the data connectors of the plurality of battery slots; and
   the power-directing circuit being configured to direct power from the power source to the at least one charging connector based on the battery data comprises the power source supplying power to charging connector of the at least one battery slot based on the battery data from the plurality of battery slots.

9. A method comprising:
   providing a cooling chamber;
   providing a plurality of battery slots at least partially cooled by the cooling chamber;

providing a cooler connected to the cooling chamber;
providing a power source in electrical communication with the cooler;
providing a power-directing circuit in electrical communication with the power source and the plurality of battery slots;
receiving a battery in one of the battery slots;
determining a temperature of the battery;
cooling the battery to a predetermined temperature;
using the power-directing circuit to read battery data from the plurality of battery slots;
in response to the battery reaching the predetermined temperature, charging the battery, wherein charging the battery comprises using the power-directing circuit to direct power from the power source to at least one of the battery slots based on the battery data; and
removing the battery from the battery slot to power a device separate from the cooling chamber and the battery slot.

10. The method of claim 9, further comprising:
discharging charge from the battery; and
supplying power to a cooler with the charge.

11. The method of claim 10, further comprising determining, from the battery, a number of times the battery has been charged since discharging charge from the battery, and wherein discharging charge from the battery comprising discharging charge from the battery based on the number of times the battery has been charged since discharging charge from the battery.

12. The method of claim 9, wherein charging the battery comprises:
supplying power to the battery above a peak battery voltage; and
in response to the battery charge reaching a predetermined charge threshold, reducing the power supplied to the battery.

13. The method of claim 9, further comprising maintaining the battery at a second predetermined temperature in response to charging the battery.

14. The method of claim 9, wherein determining a temperature of the battery comprises determining the temperature of each battery of a plurality of batteries.

15. The method of claim 14, wherein charging the battery comprises supplying charge to each of the plurality of batteries based on the temperature of each battery.

16. A system comprising:
a battery-cooling apparatus comprising
a cooling chamber,
a plurality of battery slots at least partially cooled by the cooling chamber;
a cooler connected to the cooling chamber,
a power source in electrical communication with the cooler, and
a power-directing circuit in electrical communication with the power source and the plurality of battery slots, wherein the power-directing circuit is configured to read battery data from the plurality of battery slots, and direct power from the power source to at least one of the battery slots based on the battery data; and
a battery configured to be selectively disposed in at least one of the battery slots.

17. The system of claim 16, wherein the cooler is configured to receive power from the battery.

18. The system of claim 16, wherein the power-directing circuit is configured to:
direct power from the power source to the battery above a peak battery voltage; and
in response to a battery charge of the battery reaching a predetermined charge threshold, reducing the power from the power source to the battery.

* * * * *